United States Patent [19]

Schulte et al.

[11] Patent Number: 5,736,941
[45] Date of Patent: Apr. 7, 1998

[54] NAVIGATION DEVICE FOR A LAND VEHICLE WITH MEANS FOR GENERATING A MULTI-ELEMENT ANTICIPATORY SPEECH MESSAGE, AND A VEHICLE COMPRISING SUCH DEVICE

[75] Inventors: Hans-Helmut Schulte; Johannes H.M. Kleijnen; Eduardus W.M. Conijn, all of Eindhoven, Netherlands

[73] Assignee: U.S. Philips Corporation, New York, N.Y.

[21] Appl. No.: 511,504

[22] Filed: Aug. 4, 1995

[30] Foreign Application Priority Data

Aug. 8, 1994 [EP] European Pat. Off. ............. 94202271

[51] Int. Cl.⁶ ...................................... G08G 1/123
[52] U.S. Cl. .................. 340/995; 340/988; 364/449.3; 364/449.5
[58] Field of Search ......................... 340/988, 990, 340/995; 364/444, 449, 449.1, 449.2, 449.3, 449.5

[56] References Cited

U.S. PATENT DOCUMENTS

| 4,939,662 | 7/1990 | Nimura et al. ............. 340/995 |
| 5,031,104 | 7/1991 | Ikeda et al. ............... 340/995 |
| 5,043,902 | 8/1991 | Yokoyama et al. .......... 340/995 |
| 5,197,009 | 3/1993 | Hoffman, Jr. et al. ....... 340/995 |
| 5,565,874 | 10/1996 | Rode ..................... 340/995 |

FOREIGN PATENT DOCUMENTS

| 0218273 | 4/1987 | European Pat. Off. . |
| 0534533 | 3/1993 | European Pat. Off. . |
| 0542331 | 5/1993 | European Pat. Off. . |
| 0543459 | 5/1993 | European Pat. Off. . |
| 0560987 | 9/1993 | European Pat. Off. . |

*Primary Examiner*—Brent A. Swarthout
*Attorney, Agent, or Firm*—Arthur G. Schaier

[57] ABSTRACT

A navigation device for a land vehicle with means for generating a multi-element anticipatory speech message, and a vehicle comprising such device. A navigation device for a land vehicle senses vehicle displacement and stores map data. Matching of the displacement to the map data produces actual position and motion of the vehicle. Under control of user input, an intended route from an actual position to a destination is calculated. Under control of actual motion and with respect to selected elements of the intended route an anticipatory speech message is generated from a speech message directory. The message comprises a sequence of a message location prefix, a message action advice, and a message outcome suffix. The elements of the sequence may be represented in the directory by synthetic or recorded natural speech.

15 Claims, 3 Drawing Sheets

NAVIGATION DEVICE FOR A LAND VEHICLE WITH MEANS FOR GENERATING A MULTI-ELEMENT ANTICIPATORY SPEECH MESSAGE, AND A VEHICLE COMPRISING SUCH DEVICE

BACKGROUND OF THE INVENTION

The invention relates to a navigation device for a land vehicle comprising sensing means for sensing a displacement of the vehicle, map data storage means for storing map data, matching means for matching said displacement to said map data for generating an actual position and an actual motion of the vehicle, and route planning means for under control of an intended destination received from a user, calculating an intended route from said actual position to said destination. The assignee of the present invention has been active in developing systems for providing vehicle drivers with route guidance and other instructive information during their itinerary. U.S. Pat. Nos. 4,791,574, 5,629,854, and 5,537,323, all to the same assignee as the present application are being herein incorporated by reference. It has been found that the presentation of such information is often time-critical, so that the information must not be given too early, and not too late either, with respect to the occurrence of difficult situations, such as road crossings, junctions, and various other. Moreover, the information should distract the driver as little as possible, and therefore be uniformly formatted on the one hand, and on the other hand emulating the instructions as closely as possible as being given by a human person. Now, the inventor has experienced the occurrence of confusing and composite situations, where an instruction to the driver could still cause uncertainty as to what action should be undertaken.

SUMMARY OF THE INVENTION

Accordingly, amongst other things, it is an object of the invention to produce such messages as a standard string of elements that state where the action must be taken, what the action is, and what the outcome of the action by the driver will be, so as to provide only little distraction for the driver, as well as only little uncertainty. Now, according to one of its aspects, the invention provides anticipating means for under control of said actual position and/or motion and said intended route, with respect to selected elements of said intended route generating an anticipatory speech message from a speech message directory as comprising a sequence of a 'message location prefix', a 'message action advice', and a 'message outcome suffix', all elements of said sequence being separately recorded in said directory. By itself, the concatenation of message elements has been disclosed in EP-A 543,459, corresponding U.S. Pat. No. 5,621,891 to the same assignee. Here the message principally relates to announce the status of a train connection, wherein certain reusable parts of the message are represented in natural speech, and other more particular messages are represented by synthetic speech. The present invention is used in a fully different environment, to wit, information systems for the driver of a specific vehicle, and also do the messages have a completely different structure and purpose. An additional advantage of the modular construction of the messages is that most elements are reusable, thereby diminishing storage requirements by several orders of magnitude.

Advantageously, said "message action advice", and said "message outcome suffix" each have a respective finite repertoire, in said directory, and said directory is arranged for by means of elements of said repertoire addressing stored single words with reusability of such words among differently positioned elements in said sequence. The codes for the three elements of the sequence can well be shared among the various main European languages. Within each of the elements, the sentence structure, as well as the words proper are different. Experience has indicated however that many words can be shared amongst elements on the same position in the sequence, such as, amongst the various instances of the "message action advice". Even between differently positioned elements of the sequence, various words have proven reusable. This furthermore diminishes storage requirements.

Advantageously, the speech is exclusively recorded natural speech. Natural speech is generally more agreeable, and therefore, less distracting. Advantageously, either of the message location prefix and the message outcome suffix are optional as controlled by the stored map data. In many cases, the full sequence is not necessary, so that the reproduced message gets shorter. Advantageously, the directory comprises a concatenation element for concatenating the sequences. This feature allows the device to cope with still further complicated situations.

The invention also relates to a motor vehicle comprising a device as described supra. Various further advantageous aspects are recited in dependent claims.

BRIEF DESCRIPTION OF THE DRAWINGS

These and other aspects and advantages of the invention will be described more in detail with reference to the preferred embodiments disclosed hereinafter, and in particular with reference to the appended Figures, that show.

Further, Tables 1, 2 give exemplary contents of the directory.

DETAILED DESCRIPTION OF PREFERRED EMBODIMENTS

Figure 1:
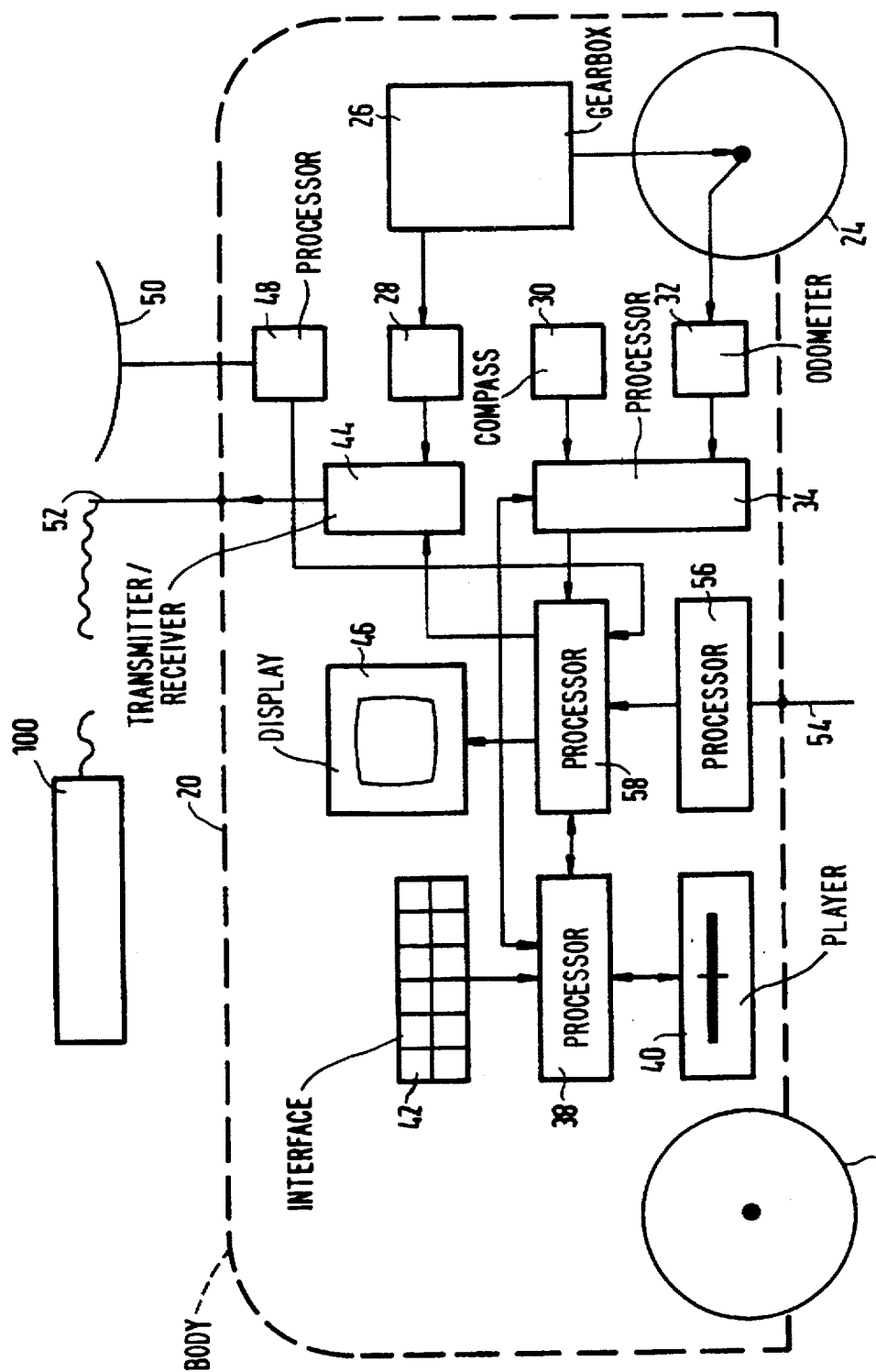
FIG. 1 an overall diagram of a vehicle comprising a device according to the invention.
Figure 2:
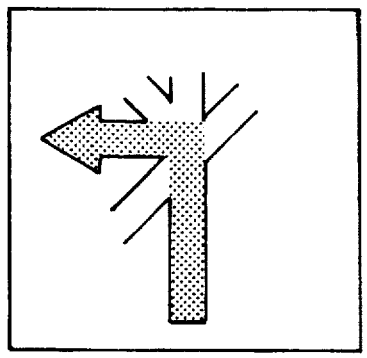
FIGS. 2 to 8 illustrating the message constructing policy.

FIG. 1 shows an overall diagram of a device according to the invention as located within a more or less standard motor car or vehicle, that has been shown in a very schematic way only. The car has a body 20, front wheels 22, and rear wheels 24 that are driven by a combination of motor and gearbox 26. For simplicity, the user interface to the motor and other mechanical controls of the car have not been shown. The car as shown has various systems for determining its actual position. First, there is a compass 30. Second, there is an odometer combination 32, that may have a separate odometer on each one of a wheel pair. In the Figure, this has been shown for the rear, driven wheels, but in practice, usually the front wheels are chosen. The average displacement signalled by the two odometers in combination with the compass reading gives the distance and direction travelled. The difference between the two odometer readings is used to calculate turns, which in combination with the compass may produce corrections and/or calibrations to the distance travelled. These and other calculations are effected in processor 34. By itself the necessary mathematical calculations may be conventional.

A second position determining system has disc antenna 50 that receives wave patterns from various GPS satellites, from which wave patterns in processor 48 an actual position is calculated. A third position determining system has antenna 54 that receives location codes from roadside beacons that have a limited transmission range. Through recognition of the codes, in processor 56 the actual position is ascertained.

Block 40 is a CD-ROM player that contains a random accessible optical disk with geographical data. This data can be accessed by routeplanner processor 38 under selective control from user interface 42 that contains a number of actuatable keys. Inputting of a starting position and of a destination activates access of appropriate map data from player 40. On the other hand, it would be feasible to remotely input an intended destination, for example by a fleet management entity. From the destination and an actual position, processor 38 calculates an optimum route, an expected time of arrival, and possibly various intermediate instants on which the vehicle is expected to pass along relevant points of the route. Processor 58 combines the position data produced by processors 34 (sensor determined), 48 (GPS determined) and 56 (through beacon signals), as far as appropriate, accesses the geographical data from player 40 that are relevant to the preliminary actual position as calculated and maps these on the actual map. Dead-reckoning maps the calculated preliminary position on the most probable actual road position, when off-road motion may be ignored. Actual position and planned route in a larger or smaller neighbourhood of the actual position can be displayed on display element 46 in map form. Other data relevant to the driver may be displayed as well, such as actual time, expected time of arrival, and instantaneous guidance indications such as arrows, and destination.

In practice, not all three position data generation mechanisms will be present. The beacon system is by itself sufficient, as long as the beacon infrastructure has been realized, for example by means of beacons on all major roads at half kilometre beacon-to-beacon distances. The GPS system may by itself be sufficient if obstacles such as high-rise buildings are sufficiently rare and the GPS accuracy is good. In practice, the CD-ROM support is however necessary for avoiding drift arising from inaccurate sensors or bridging temporary failure of the other methods. As an alternative, the map data may be supplied by a broadcast mechanism.

Central processor 58 is connected to the transmitter-receiver 44, to the routeplanning processor 38, and also to the position determining processors 34 and 56.

Block 44 is a transmitter-receiver for a cellular broadcast system which has a limited range that is suited for the cell size that may amount to a few kilometres. Element 52 is the associated antenna that may be shared with other systems, such as radio or telephone. The actual position may be formatted and via antenna 52 broadcast to the central station 100. As far as necessary, the message may contain other relevant information, such as an internal change of status of the vehicle. Other mechanisms for the latter transmission are feasible as well, such as transmission by satellite or via the roadside beacon infrastructure.

FIGS. 2 to 8 illustrate the message constructing policy, in the form of more or less complex road configurations. Now in practice, many traffic situations are elementary. An isolated crossing could be signalled by the guidance mechanism just by choosing between the messages 'straight on' (or even nothing), 'turn right' and 'turn left'. The present invention is directed to also cope with more complex situations. Then for example, the message must often, for timing reasons be given at an instant of time where the driver either is not yet aware of the object, because it is invisible, or is distracted by a previous object. For example, in FIG. 2, the turning to be taken may be obscured until the vehicle has nearly arrived at the junction itself. This problem is solved by first giving a message location prefix, indicating where the vehicle should be when considering the action to be taken, then giving a message action advice, that indicates what should be done, and finally giving a message outcome suffix that takes all uncertainty in the driver's mind away. The total sequence ends then by signalling either an action or a position or direction qualification. Often however, it is not necessary to give the full sequence, but it is possible to leave out prefix or suffix. Therefore, with respect to FIG. 2, the full message would be 'At the next junction, take the second left hand turning'. Herein, the comma indicates the separation between the various parts of the sequence. The representation of the Figure itself is a more or less stylized representation of the actual geographical shape of the map. The instant when, or the location where the sequence must be outputted, is determined along a strategy that has extensively been disclosed in copending EP Patent Application 940201903.5, which corresponds to U.S. patent application Ser. No. 08/496,105 to the same assignee, herein incorporated by reference.

Figure 3:
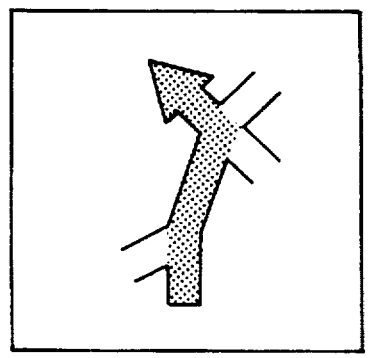
Figure 4:
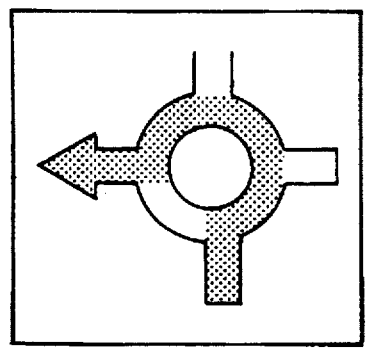
Figure 5:
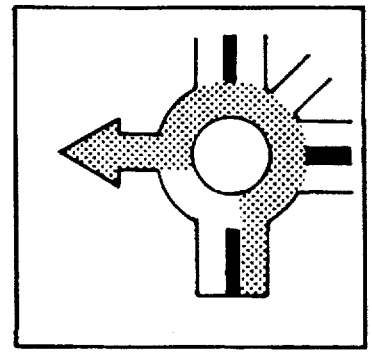
Figure 6:
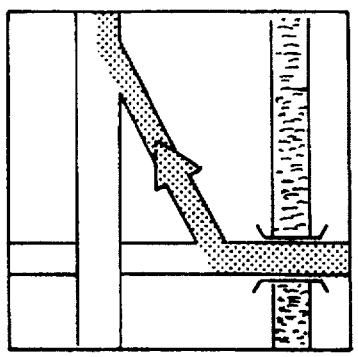

In a comparable organization shown in FIG. 3, the vehicle must first pass the first turning on the left, and then take the second one, while following a relatively minor directional change at the first turning. Therefore, the complete message is: 'Take the second turning on the left', which message has not been decomposed into respective parts. In the comparable situation of FIG. 4, the vehicle must first turn the greater part of the roundabout, and then turn left (with respect to the original direction of arrival). The message is then: 'At the roundabout, turn left'. Also here, the suffix has been left out. In the comparable situation of FIG. 5, the roundabout has so many exits that the decomposition must be different: 'At the roundabout, take the fourth exit'. The different realization of the message is thus controlled by the structural data of roundabout, or of the turning, as the case may be. If the approaching road would present an unclear situation to the driver, a message location prefix would be joined to the beginning of the sequence. This unclear situation is available with the map data, in particular as a parameter of the road section that approaches the junction or roundabout. In FIG. 6, the vehicle must first pass the bridge, before the right to the entrance of the Motorway turn becomes visible. In this case, the full sequence is: 'Over the bridge, turn right, to join the Motorway'. It should be noted that the transitions between the various elements of the sequence may be smooth, or alternatively may present a minute pause in the stream of speech, according to optimum intelligibility. The speech may be stored in the memory either as recorded natural speech, for example as digital speech sample codes according to the MPEG audio standard. Alternatively, the speech is stored as a string of codes that each signify a phoneme, and these codes are translated into the understandable, but synthetic phonemes.

Figure 7:
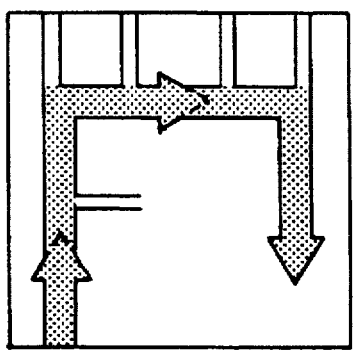

The elements may be stored as a whole for direct accessing. Alternatively, the elements are stored in the form of pointers to the actual words of the elements. Here "word" is to be understood as a speech element that can be separately addressed in a costeffective manner. Thus, it could be a "word" in its linguistic meaning, but also a syllable or other word part, or rather a concatenation of two words that always come together, such as "hand turn" and "Main road" in the example of Table 1. This feature allows further storage reduction through the sharing or reusing of storage space. The codes of the elements of a message may generally be language independent, the pointing to the words is in general language dependent. By itself, the generation proper of the speech can be done in conventional manner. FIG. 7 is a more complex situation, where two successive actions must be taken directly after each other. This is solved by concatenating two sequences, that are concatenated by a single concatenating element: 'Take the second turning on the right, then, at the end of the road, turn right'. In principle, it is possible to concatenate an unlimited number of sequences that each have three elements. In practice, restrictions on what the human person can take up in a single sentence, dictate a maximum of about five or six elements within a single message, inclusive of the concatenating element. In practice, the messages as explained are given at geographical distances of a few hundred meters, or at temporal distances of a few tens of seconds in advance of the place where the action must be taken. If it is necessary to still earlier give some explanation to the driver, this is done by a separate, one element notification message, that either signals a forthcoming action, or indicates a preparatory action such a changing to the correct traffic lane.

Figure 8:
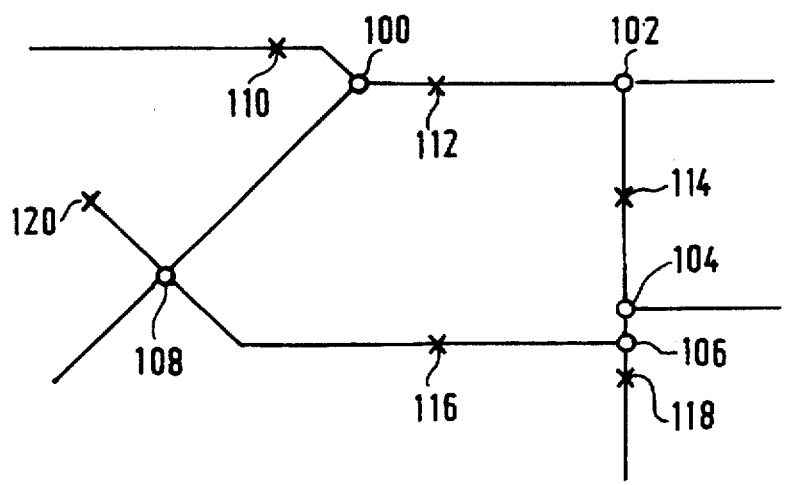

FIG. 8 indicates an elementary road map, showing the roads as straight lines, the junctions by small circles (100–108), and various other critical points by crosses (110–120), that may represent a bend 110, bridges 112, 116, entrance to a square 114, 118, and a parking lot 120. As regards the junctions, for each of them a list of possible actions is stored together with the map information.

Table 1 gives exemplary contents of the directory, for the English language. For other languages comparable message elements would be stored. There are fourteen message location prefixes. There are thirty seven message action advices. There are seventeen message outcome suffixes. As explained, the message location prefix or the message outcome suffix may be left out, if any of them does not apply. Furthermore, for attaining full functionality, Table 2 gives various sets of single element messages, as follows: Item 1 is a status report that signals that the system is ready. Other status reports are discussed hereinafter.

Items 2–12 are junction notifications that are generated by the system somewhat earlier than the message action advice, for example, about one minute or one kilometer before the junction in question. This has extensively been discussed in the cited EP Patent Application. Like wise, item 13 is an arrival notification, that is given sometime before the arrival.

Items 14–16 are arrival announcements, that are given at the instant of the actual arrival at the destination.

Item 17 is the concatenation element, that has been discussed supra.

Items 18–25 are further status reports that are not used on the level of the present invention, but at a higher level of organization, for example, to signal uncommon situations, such as 'vehicle leaves road' (which makes the mapping impossible), or problems with the mass memory that is no longer applicable to the position where the vehicle is (22–25). Therein, items 19–21 are not embodied by speech, but by other types of signalization as indicated.

TABLE 1

| Prefix Messages | Advice Messages | Suffix Messages |
| --- | --- | --- |
| 1. "At the next Junction" | 1. "Straight on" | 1. "Over the bridge" |
| 2. "At the second Junction" | 2. "Fork left" | 2. "Through the tunnel" |
| 3. "At the third Junction" | 3. "Fork right" | 3. "To follow the Main road" |
| 4. "At the fourth Junction" | 4. "Keep to the left" | 4. "Caution, entering a vehicle prohibited road" |
| 5. "At the Roundabout" | 5. "Keep to the right" | 5. "To join the Main road" |
| 6. "At the Square" | 6. "If possible, make a U-turn" | 6. "To join the Motorway" |
| 7. "At the end of the road" | 7. "Turn left" | 7. "To enter the Parking place" |
| 8. "Before the bridge" | 8. "Take the first turning on the left" | 8. "To enter the Service road" |
| 9. "Before the tunnel" | | 9. "To enter the railway station" |
| 10. "Before the viaduct" | 9. "Take the second turning on the left" | 10. "To enter the ferry terminal" |
| 11. "After the bridge" | | 11. "To exit the vehicle prohibited road" |
| 12. "After the tunnel" | 10. "Take the third turning on the left" | |
| 13. "After the viaduct" | | 12. "To exit the Main road" |
| 14. "After the bend" | 11. "Take the fourth turning on the left" | 13. "To exit the Motorway" |
| | 12. "Turn right" | 14. "To exit the Parking place" |
| | 13. "Take the first turning on the right" | 15. "In front of You" |
| | | 16. "To the left" |
| | 14. "Take the second turning on the right" | 17. "To the right" |
| | 15. "Take the third turning on the right" | |
| | 16. "Take the fourth turning on the right" | |
| | 17. "Take the next exit" | |
| | 18. "Take the first exit" | |
| | 19. "Take the second exit" | |
| | 20. "Take the third exit" | |
| | 21. "Take the fourth exit" | |
| | 22. "Take the fifth exit" | |
| | 23. "Take the sixth exit" | |
| | 24. "Take the seventh exit" | |
| | 25. "Take the eighth exit" | |
| | 26. "Take the ninth exit" | |
| | 27. "Take the tenth exit" | |
| | 28. "Take the eleventh exit" | |
| | 29. "Take the twelfth exit" | |
| | 30. "Take the first L hand turning" | |
| | 31. "Take the second L hand turning" | |
| | 32. "Take the third L hand | |

TABLE 1-continued

| Prefix Messages | Advice Messages | Suffix Messages |
|---|---|---|
| | turning" | |
| | 33. "Take the fourth L hand turning" | |
| | 34. "Take the first R hand turning" | |
| | 35. "Take the second R hand turning" | |
| | 36. "Take the third R hand turning" | |
| | 37. "Take the fourth R hand turning" | |

TABLE 2

| Rest of the Messages | |
|---|---|
| 1. "Start driving" | Status report |
| 2. "Vehicle prohibited road ahead" | Junction Notifications |
| 3. "Exit ahead" | |
| 4. "Roundabout ahead" | |
| 5. "Exit to the left ahead" | |
| 6. "Exit to the right ahead" | |
| 7. "Keep to the left ahead" | |
| 8. "Keep to the right ahead" | |
| 9. "Left turn ahead" | |
| 10. "Right turn ahead" | |
| 11. "Straight on ahead" | |
| 12. "U-turn ahead" | |
| 13. "Destination is ahead" | Arrival Notification |
| 14. "You have arrived" | Arrival Announcements |
| 15. "You have arrived the Destination is" | |
| 16. "You have arrived the Destination is a vehicle prohibited road" | |
| 17. "then" | Concatentation |
| 18. "Relocation needed" | Status reports |
| 19. Short beep | |
| 20. Continuous beep | |
| 21. Silence | |
| 22. "Attention, You are leaving the digitised map area, please change the Map-CD" | |
| 23. "Please change the Map-CD" | |
| 24. "Please stop and change the Map-CD" | |
| 25. "Please insert the appropriate Map-CD" | |

What is claimed is:

1. A motor vehicle comprising:
means for displacing said vehicle along a route; and
a navigation device having sensing means for sensing a displacement of the vehicle; storage means for storing map data;
means for matching the displacement of the vehicle to the map data stored in the storage means;
means for monitoring at least one of a position and motion of said vehicle;
route planning means for planning an intended route for said vehicle from a first position to a second position; and
anticipating means for generating an anticipatory speech message before reaching an upcoming location from a speech message directory based on at least one of said position and motion of said vehicle, said anticipatory speech message including a prefix message that identifies an upcoming location, an action message that identifies an action to be taken at or about said location and a message suffix relating to said action taken and identifies an intended location as a result of said action taken.

2. A navigation device for a land vehicle, said device comprising:
sensing means for sensing a displacement of the vehicle;
storage means for storing map data;
means for matching the displacement of the vehicle to the map data stored in the storage means;
means for monitoring at least one of a position and motion of said vehicle;
route planning means for planning an intended route for said vehicle from a first position to a second position; and
anticipating means for generating an anticipatory speech message before reaching an upcoming location from a speech message directory based on at least one of said position and motion of said vehicle, said anticipatory speech message including a prefix message that identifies an upcoming location, an action message that identifies an action to be taken at or about said location and a message suffix relating to said action taken and identifies an intended location as a result of said action taken.

3. The device as claimed in claim 2, wherein said prefix message, said action message and said message suffix are linkable to form a message sequence; each of said prefix message, said action message and said message suffix being made up of one or more words; and wherein at least a plurality of said words in said directory are usable in more than one message portion, a message portion being defined as one of said prefix message, action message or message suffix.

4. The device as claimed in claim 2, wherein said prefix message, said action message and said message suffix each have a finite repertoire.

5. The device as claimed in claim 3, wherein said message sequence is language-dependent.

6. The device as claimed in claim 2, wherein the anticipatory message is recorded natural speech in said directory.

7. The device as claimed in claim 2, wherein said message suffix is optional as controlled by the stored map data.

8. The device as claimed in claim 2, wherein said prefix message is optional as controlled by the stored map data.

9. The device as claimed in claim 3, wherein said sequence forms a grammar-allowed sentence of a natural language.

10. The device as claimed in claim 2, wherein said message suffix either signals an action or signals a position or direction qualification.

11. The device as claimed in claim 2, wherein said directory comprises at least one further subset of one-element messages from the group of 'junction notifications', 'arrival notifications', and 'status reports'.

12. The device as claimed in claim 3, wherein said directory comprises a concatenation element for joining more than one message sequence.

13. The device as claimed in claim 3, wherein the anticipatory message is recorded natural speech in said directory.

14. The device as claimed in claim 2, wherein said message suffix is optional as controlled by the stored map data.

15. The device as claimed in claim 2, wherein said prefix message is optional as controlled by the stored map data.

* * * * *